UNITED STATES PATENT OFFICE.

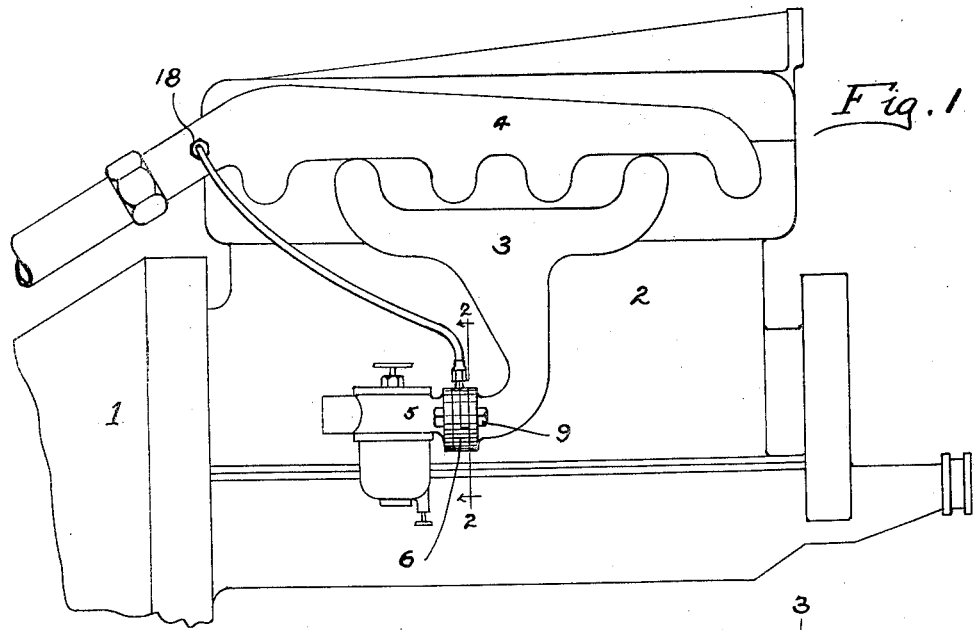
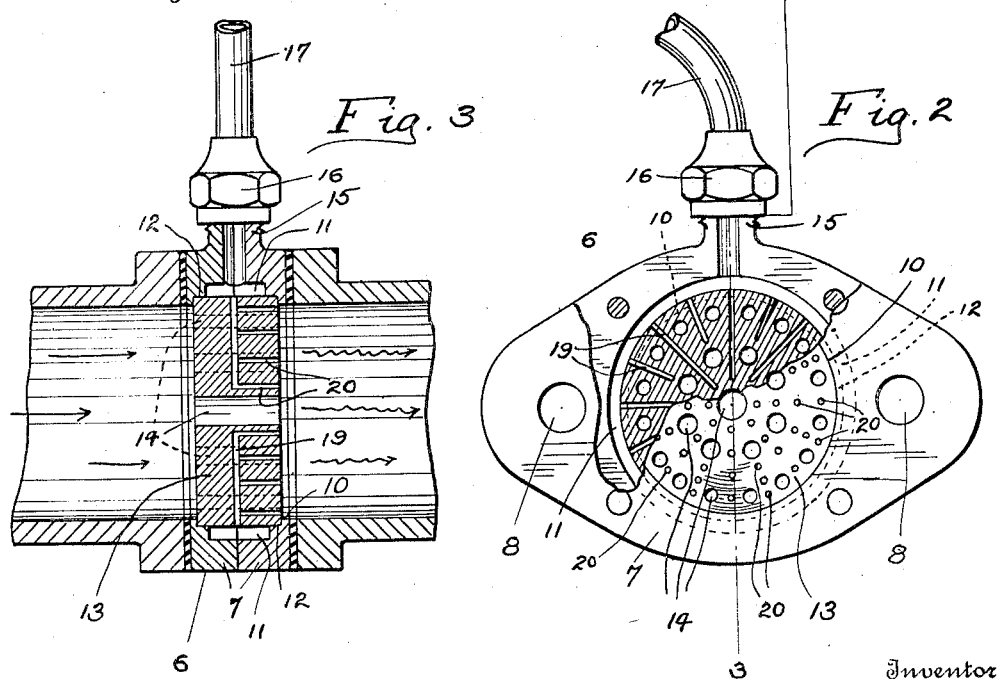

RALPH W. HARRIS, OF NEWARK, OHIO.

ENGINE ATTACHMENT.

1,382,285.

Specification of Letters Patent.

Patented June 21, 1921.

Application filed September 3, 1920. Serial No. 408,035.

*To all whom it may concern:*

Be it known that I, RALPH W. HARRIS, a citizen of the United States, residing at Newark, in the county of Licking and State of Ohio, have invented certain new and useful Improvements in Engine Attachments, of which the following is a specification.

This invention relates to a vaporizing attachment for the intake manifolds of internal combustion engines, and has for its object to provide a device of this nature which will be capable of being situated within the fuel intake manifold for the purpose of heating, vaporizing or gasifying the fuel delivered to said engine when said fuel is in transit from the carbureter to the cylinders, this object being primarily accomplished by the provision of a heated screen of peculiar configuration which is disposed within the intake manifold and perforated to permit of the flow of the fuel mixture therethrough and heated in an effective manner by a portion of the exhaust gases taken from the exhaust manifold of the engine.

It is well known that modern carbureters using standard fuels do not produce an ideal thoroughly vaporized fuel mixture, that is, the fuel mixture discharged from such carbureters is more or less saturated condition, causing particles or globules of fuel to be carried with the air and to remain in practically the same physical condition during their travel through the intake manifold and into the cylinders of an engine. The fuel in this condition is not only injurious in its action on the walls of the cylinder, due to the fact that it combines with the lubricant and produces carbonization, but its efficiency as a power producer is seriously diminished by reason of waste and imperfect combustion. Correct conditions require that the fuel and air should be thoroughly mixed or homogenized with the fuel nebulized or reduced to a finely vaporized condition, as the gaseous condition is of course the ideal for effective operation, but is extremely difficult to attain by ordinary carburation. However, by the use of the present invention this end has been substantially achieved and a thoroughly vaporized mixture produced for engine consumption.

The present invention, therefore, aims to provide means which will so nebulize the fuel as to prevent the entry of articles of the same in a globular condition into engine cylinders, and to homogenize to a very high degree the air and fuel of the mixture, from which the power of the engine is derived. In attaining this object, the present invention consists in the provision of a fuel homogenizing attachment which comprises substantially a flat metallic body capable of being removed between the carbureter and intake manifold connections of an engine, said body being provided with a perforated heating unit which is securely retained by said body and so positioned that the fuel in order to pass from the carbureter to the manifold connections will be obliged to circulate therethrough, and to provide said body with a hollow chamber disposed in communication with ports provided in said heating unit and in communication with said intake manifold, and in the provision of means for leading a quantity of the heated exhaust gases from the exhaust manifold of an engine to said chamber, whereby such gases may be circulated through the ports of the heating unit to thoroughly heat the latter, so that the fuel mixture flowing from the carbureter will be subjected to the heat of said unit and in this manner thoroughly and efficiently vaporized when delivered to the engine cylinders. Also, by the introduction of the exhaust gases directly into the intake manifold, the complete elimination of unvaporized fuel globules will be insured and efficiency in combustion attained.

A further object of the invention resides in an attachment of the above nature which will be simple, inexpensive and efficiently constructed and capable of being readily applied in conjunction with an associated engine, without altering the construction of the latter.

In the drawing wherein has been shown a single embodiment of the invention for purposes of disclosure, but without intent to limit the invention, in its broader aspects, to the details thereof:

Figure 1 shows conventionally an engine equipped with the fuel homogenizing attachment comprising the present invention, Fig. 2 is a vertical transverse sectional view taken on the plane disclosed by the line 2—2 of Fig. 1, and Fig. 3 is a vertical sectional view taken on the line 3—3 of Fig. 2.

In the accompanying drawing the numeral 1 designates an internal combustion engine, wherein is included the usual cylinder block 2, intake manifold 3, an exhaust manifold 4, and a carbureter 5.

In the intake conduit, between the manifold 3 and the carbureter 5 I locate my improved homogenizing attachment 6, in order that the same will be interposed in the path of travel of the fuel mixture between the carbureter and the intake manifold. Preferably, this attachment 6 comprises a split two part shell or body 7, which is of the flat oval configuration disclosed, the same being provided at its sides with openings 8, through which the attaching bolts 9 pass for the purpose of securely situating the attachment between the secured ends of the intake manifold and the carbureter 5.

The shell 7 is provided with an axial opening 10, which is of substantially the same cross sectional area as the internal port of the manifold 3, and the opening 10 communicates with an annular chamber 11 and a heating unit receiving socket 12. Arranged to be positioned within this socket are the outer circumferential edges of a perforated heating unit 13, which latter is provided with a plurality of longitudinally extending openings 14, which establish communication between the carbureter 5 and the intake manifold 3 in order to permit of the passage of the fuel mixture from the carbureter to the engine cylinders. By reason of the two part construction of the shell 7, it will be manifest that the heating unit may be readily and securely retained within said shell.

In order to completely vaporize the fuel mixture, the shell 7 is provided with a threaded nipple 15, which is provided with a central bore communicating with the chamber 11. Connected with this nipple is a nut 16, which carries a small bore copper pipe 17, the latter leading to a connection 18 with the exhaust manifold 4, and is in communication with said exhaust manifold in order that the heated gases passing through the latter may be led in part through the pipe 17 and thence to the annular chamber 11 surrounding the heating unit. Communicating with the chamber 11 are radially extending ports 19, which pass between the openings 14, and these ports are, in turn, in communication with short laterally extending ports 20, which open into the intake manifold 3.

Obviously, by virtue of this construction the heated gases from the exhaust manifold will, in the operation of the attachment, pass into the pipe 17 and will be thereby delivered into the annular chamber 11. From this chamber the gases circulate through the ports 19 and 20 of the heating unit and since the latter is of skeleton construction, it will be apparent that the heating unit will in a short time, after the starting of the engine, become highly heated so that the fuel mixture circulating through the heating unit will have its temperature sufficiently raised to effect the desired vaporization and elimination of fuel globules. Also, it will be observed that by the provision of the ports 20 the heated gases will be discharged into the intake manifold, whereupon the gases will commingle with the fuel mixture to further assist in the gasifying of said mixture. This results in a completely vaporized and gaseous fuel mixture, which may be used with maximum efficiency for combustion purposes, will eliminate carbon deposit within engine cylinders to a very marked extent and also the fouling of the spark plugs, and moreover, by completely vaporizing the fuel mixture economy may be secured from a standpoint of fuel consumption. The device is obviously of simple construction and when applied is fully automatic in operation and does not require manual attention.

What is claimed is:

1. A fuel mixture homogenizer for internal combustion engines, comprising a body portion arranged to be positioned in connection with the intake conduit of an engine, a perforated heating plate carried by said portion and situated within said conduit, said plate having openings formed therein to permit of the passage of the fuel mixture therethrough, said body portion being provided with an annular chamber disposed in communication with ports provided in said plate and establishing communication between said conduit and said chamber, and means for leading a portion of the exhaust gases of said engine into said chamber to effect the heating of said plate and the introduction of said gases into said conduit.

2. A fuel mixture homogenizing attachment for internal combustion engines, comprising a body portion arranged to be clamped between the carbureter and intake manifold connections of an engine, a perforated plate carried by said body portion and situated within the intake conduit of the engine, said plate being provided with longitudinal openings capable of permitting of the flow of the fuel mixture from the carbureter connection to the intake manifold, said body portion being provided with an annular chamber surrounding said heating plate, said plate being provided with ports arranged to establish communication between said chamber and said intake manifold, said ports being arranged independently of said openings, and a connection between said chamber and the exhaust manifold of said engine, whereby heated gases may be delivered to said chamber and permitted to circulate through said ports and into said intake manifold for fuel vaporizing purposes.

3. A mixture homogenizing attachment for internal combustion engines, comprising a body portion of two part construction arranged to be positioned in connection with the fuel intake conduit of an engine, a heating plate clamped between the two parts of said body portion and situated within said fuel conduit, said plate being provided with longitudinal openings capable of permitting of the circulation of the fuel mixture through said plate when passing through said conduit, said body portion being provided with an annular chamber surrounding the circumferential edges of said plate, said plate being provided with ports disposed to establish communication between said chamber and the engine side of said conduit, and means for admitting heated gases derived from the exhaust of said engine into said chamber, and to permit of the circulation of said gases through said ports and into said conduit to vaporize the fuel mixture.

In testimony whereof I affix my signature.

RALPH W. HARRIS.